(12) United States Patent
Noyer et al.

(10) Patent No.: US 8,229,698 B2
(45) Date of Patent: Jul. 24, 2012

(54) METHOD FOR DETERMINING A HIGHLY ACCURATE POSITION OF ROUTES AND/OR OBJECTS

(75) Inventors: Ulf Noyer, Braunschweig (DE); Nico Niehoff, Sickte (DE)

(73) Assignee: Deutches Zentrum für Luft—und Raumfahrt e. V., Cologne (DE)

( * ) Notice: Subject to any disclaimer, the term of this patent is extended or adjusted under 35 U.S.C. 154(b) by 1101 days.

(21) Appl. No.: 12/035,058

(22) Filed: Feb. 21, 2008

(65) Prior Publication Data

US 2008/0208520 A1    Aug. 28, 2008

(30) Foreign Application Priority Data

Feb. 26, 2007    (DE) .......................... 10 2007 009 639

(51) Int. Cl.
*G06F 15/00*    (2006.01)
(52) U.S. Cl. ........ 702/150; 701/118; 701/213; 701/300; 701/301
(58) Field of Classification Search .................. 701/208, 701/220, 118, 213, 300, 301; 702/150
See application file for complete search history.

(56) References Cited

U.S. PATENT DOCUMENTS 6,236,938 B1 *    5/2001    Atkinson et al. ............... 701/469
2003/0216865 A1 *    11/2003    Riewe et al. .................. 701/220

FOREIGN PATENT DOCUMENTS

| DE | 19916967 | 11/2000 |
|---|---|---|
| DE | 10 2004 010197 | 9/2005 |
| DE | 10 2005 036 049 A1 | 2/2007 |

OTHER PUBLICATIONS

A main page of the site www.streetmapper.net, p. 1.

* cited by examiner

*Primary Examiner* — John Nguyen
*Assistant Examiner* — Rodney P King
(74) *Attorney, Agent, or Firm* — Whitham, Curtis, Christofferson & Cook, PC

(57) ABSTRACT

The invention relates to a method for determining a highly accurate position of routes and/or objects, in which the routes and/or objects to be recorded are first of all surveyed. In this case, the teaching provides for the routes and/or objects to be recorded to be surveyed repeatedly and for the positions to be determined with the aid of statistical methods using measured values obtained by the repeated surveying operation.

12 Claims, 4 Drawing Sheets

METHOD FOR DETERMINING A HIGHLY ACCURATE POSITION OF ROUTES AND/OR OBJECTS

BACKGROUND OF THE INVENTION

1. Field of the Invention

The invention relates to a method for determining a highly accurate position of routes and/or objects, in which the routes and/or objects to be recorded are first of all surveyed.

2. Description of the Related Art

In order to create digital maps, it is necessary for the routes which are contained in the map, for example roads or rails, and possibly also objects, for example landmarks, bridges or known buildings, to be first of all surveyed in order to determine their position. The corresponding route or the corresponding object is entered in the map using this position.

In this case, routes are usually surveyed with the aid of appropriately converted vehicles which travel along a route to be surveyed and in the process continuously determine the position with the aid of position-finding systems, in particular satellite position-finding systems. This is known, for example, from the "StreetMapper" project (www.streetmapper.net) or the "ViewCar" project (www.dlr.de/fs/en/desktopdefault.aspx/tabid-1236/1690_read-3256). The individual position-finding points determined are then combined to form a line which is then subsequently entered in the map as a corresponding route. In this case, it is possible to determine, for each point on the line, the position representing the corresponding position of the route at this location.

The procedure is similar when surveying correspondingly real objects which are to be entered in the digital map. A vehicle equipped with 3D laser scanners travels along the route on which the objects to be recorded are situated. In this case, the objects to be recorded are scanned during the journey using the laser scanner, with the result that a 3D representation of the objects on the route can be created.

Another area of application for such techniques is the creation of so-called digital rail maps, in which a particular rail section first of all has to be surveyed in order to be able to determine the position of the track system. Such digital rail maps are used, for example, in construction planning. In this case, a "virtual" path parallel to the actual rail is usually surveyed when surveying the rail section so as not to hinder rail traffic. However, this procedure has the disadvantage that the measured values are usually very inaccurate, which ultimately results in inaccuracies in the digital rail map.

A further disadvantage of the abovementioned procedure is that the routes usually have to be closed to other road users so that the surveying operation can be carried out. In addition, the accuracy of the position determined depends on the accuracy of the position-finding system, with the result that it is usually impossible to increase the accuracy. This ultimately results in the digital maps created in this manner being unsuitable for applications in which an exact and highly accurate indication of the position is important.

SUMMARY OF THE INVENTION

In view of this, it is an object of the invention to specify a method for determining a highly precise position of routes and/or objects for the purpose of creating digital maps.

According to the invention, the object is achieved with the method of the type mentioned initially by virtue of the fact that the routes and/or objects to be recorded are surveyed repeatedly and the positions are determined with the aid of statistical methods using measured values obtained by the repeated surveying operation.

The teaching of the present invention accordingly provides for the routes and/or objects whose position is to be determined exactly to first of all be surveyed repeatedly. That is to say, in the case of a road to be surveyed for example, it is necessary to travel along it and survey it repeatedly. A correspondingly large number of measured values for each object or a correspondingly large number of measured value series for each route then results from these repeated surveying operations. This multiplicity of measured values which are determined by the different surveying operations is then used to determine the exact position of the route or the object with the aid of statistical methods. That is to say the series of measurements are combined with the aid of statistical methods to form a very accurate solution.

In this case, it is conceivable, for example, for the measurement errors contained in the measured values to be minimized with the aid of statistical methods. In this case, this advantageous refinement is based on the idea that the sum of measurement errors is canceled given a sufficiently large number of measured values. This makes it possible to exactly determine the position of the routes or objects to be recorded in such a manner that they are suitable for creating highly precise digital maps. These highly precise digital maps can then be used for construction planning or the like.

In order to eliminate, for example, measurement errors which are not caused by position-finding and generally differ to a greater extent than the measurement errors caused by position-finding, it is expedient to filter the measured values in an appropriate manner. This may be effected, for example, by looking for sudden changes or greatly differing measured values in the measured values. Phantom objects which appeared as measured values in a previous surveying operation but disappeared in a subsequent surveying operation can thus be determined, for example. This is because such phantom objects, but also great sudden changes or greatly differing measured values, ultimately result in the error no longer being able to be compensated for in the sum of all measured values, with the result that position determination is no longer sufficiently accurate.

The measured values originating from the repeated surveying operations are advantageously superimposed, the position of the corresponding route or of the corresponding object being determined using the superimposed measured values. When determining the position of routes, it is particularly advantageous if a plurality of planes are placed in the superimposed measured values, the measured values in the vicinity of a plane being projected onto this plane. The measured values projected onto the planes are then averaged on this plane, which is advantageously placed perpendicular to the course of the route, with the aid of a statistical method. Mean-value formation could be used, for example, as the statistical method. After the measured values on the plane have been averaged, precisely one averaged measured value exists for each plane and is then used to determine the exact position of the route at this location. The corresponding measurement errors in the sum, which are caused by position-finding, are then minimized or eliminated in this manner.

It is also advantageous if, during the surveying operations, an item of lane information which correlates with at least one measured value or indication of the position is also concomitantly determined in addition to the respective indication of the position of the route. This makes it possible, inter alia, to determine, for each indication of the position of a multilane route, the lane to which the measured indication of the position belongs. This is particularly advantageous because the operation of surveying the route is now no longer restricted to only one lane of the route. This is because the highly accurate position of a lane, and thus ultimately of the route as well, is then exclusively determined with the aid of the measured values which are in the corresponding lane. Measured values which were recorded in other lanes are not taken into account in this case. It thus becomes possible to change the lane while surveying the route without distorting the result. Exits and approach roads of freeways, for example, can also be reliably detected.

It is very particularly advantageous if the lane information can be used to determine the relative position of the measured values which correlate with the lane information. This relative position can indicate, for example, the position inside the lane or the route. However, it is also conceivable, for example, for the relative position to indicate the extent to which the measured value or measurement point differs from the right-hand highway delimitation or lane delimitation. This information can then be used to correct the measured value, which belongs to the lane information, by the relative position, with the result that the measured values are projected onto the right-hand highway delimitation, for example. The highly accurate position of the lane or route is only then determined from the measured values, which have been corrected in this manner, with the aid of the abovementioned method.

Correcting the measured values thus makes it possible to no longer have to travel along an exact virtual line when surveying the route, which is often possible only with difficulty in practice. Rather, a highly accurate digital map is created with the aid of sensor data fusion.

The highly accurate positions of at least two routes which intersect or are at a tangent, which have been determined in this manner, can then be used to determine the position of a topology. If the routes intersect or are at a tangent, it is possible to deduce that the routes will meet or approach one another in a particular region, thus making it possible to detect an intersection as a topology, for example. The position of such a topology can then be advantageously determined on the basis of the position of intersection or tangential position of the routes which intersect or are at a tangent. In this case, a topology is understood in the broadest sense as meaning arrangements in which routes cross or intersect or are at a tangent. In road traffic, these could be intersections, for example a T-intersection, or else approach roads and exits of freeways, for example. Points in rail traffic are also topologies in this sense. All those arrangements in which the linear course of the road is interrupted can thus be subsumed under topologies.

In this case, it is particularly advantageous if the position of the respective topology is determined on the basis of nodes, each node being assigned to a position of the routes involved and the positions of the nodes being arranged in a surrounding area which describes the location at which the routes intersect or are at a tangent. The positions of the nodes of the respective routes advantageously have the same position, with the result that the position of the topology can be inferred solely from the position of the nodes. This could be the case, for example, when the planes onto which the respective measurement points are projected are the same or are arranged at the same distance for all routes involved. In this case, such a node or node point represents a highly accurate position inside a route, the set of all node points of a route representing the position of the route.

If no nodes of the respective routes can be determined with exactly the same position, it is particularly advantageous to determine the position of the topology on the basis of the position of the nodes of the respective routes within a particular surrounding area, the surrounding area defining a region in which the routes intersect or are at a tangent. It is thus not absolutely necessary for the node positions of the respective routes to be exactly the same in the region of intersection in order to be able to determine the position of the corresponding topology. Rather, it is sufficient for the nodes to be arranged within a particular surrounding area in order to infer the position of the topology.

It is also particularly advantageous if a property of the topology is determined on the basis of at least one property of the routes which intersect or are at a tangent. One property of a route may be, for example, the type of traffic, for example road or rail, or else the type of traffic management, for example a one-way or two-way highway. Properties of the topology, for example whether the topology is an intersection or a point, can then be determined on the basis of these properties of the routes which intersect or are at a tangent. In addition, it is particularly advantageous if an interlinking relationship of the routes which intersect or are at a tangent is determined on the basis of these properties of the routes or the topology. Traffic flow or traffic direction relationships from one route to the next can thus be determined on the basis of these properties, for example.

Furthermore, it is particularly advantageous when determining the position of objects if the measured values for a corresponding object which are in a particular region are averaged using a statistical method in order to determine the exact position of the object. The measured values outside the region are not concomitantly included in the calculation in this case. The region is advantageously defined in a circular manner around the object; however, other shapes of the region are also conceivable, in particular in the case of relatively large objects. Such objects may be landmarks or the like, in particular.

BRIEF DESCRIPTION OF THE DRAWINGS

The invention is explained by way of example in more detail using the accompanying figures, in which.

DETAILED DESCRIPTION OF THE PREFERRED EMBODIMENT

Figure 1A:
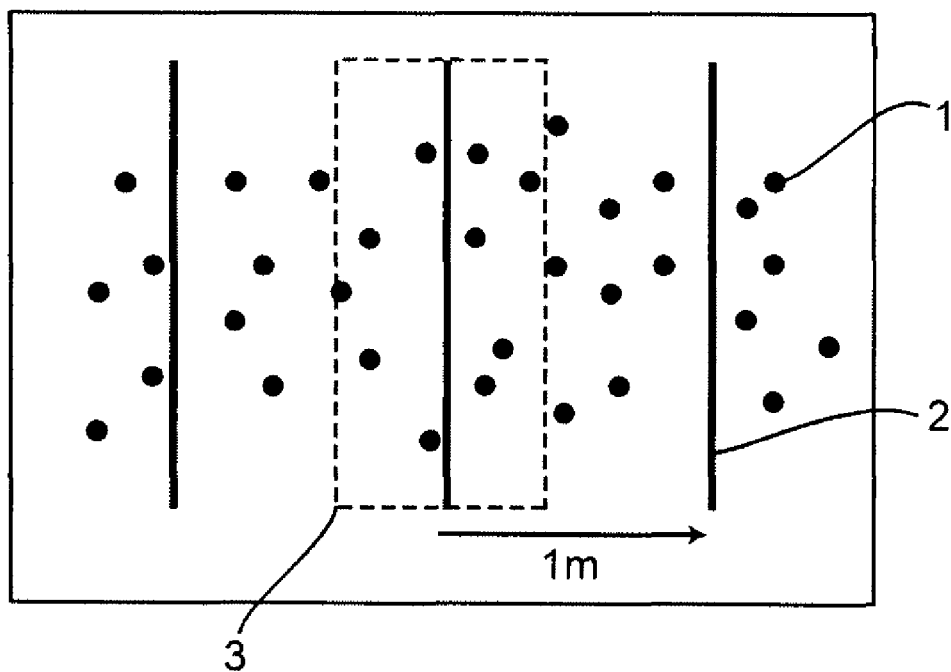
FIGS. 1a, 1b, 1c: show a diagrammatic illustration of the superimposition of the measured values, projection of the measured values onto the corresponding planes and determination of an exact position of the route.

FIG. 1a diagrammatically shows a plurality of measured values 1 which were determined when surveying a route. In this case, a plurality of surveying operations were carried out and the measured values recorded in the individual surveying operations were then superimposed, as illustrated in FIG. 1a. Corresponding planes 2 which are defined perpendicular to the course of the route were then placed in these measured values which were superimposed in this manner. These planes 2 can be placed in the measured value series at a distance of one meter, for example, as illustrated in the exemplary embodiment of FIG. 1a.

Figure 1B:
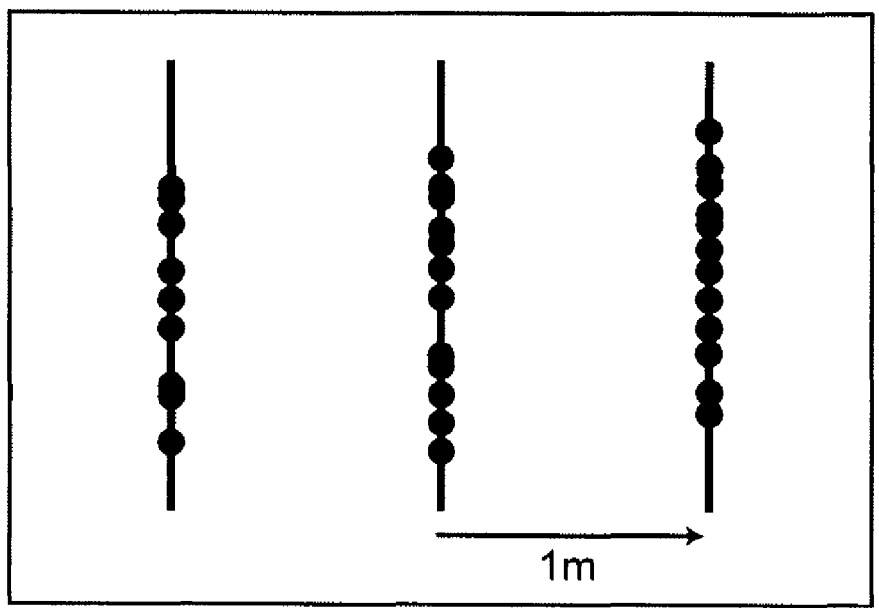

Each of these planes 2 forms a region 3 around itself. The measured values in this region 3 are then projected onto the corresponding plane, as shown in FIG. 1b. In this exemplary embodiment, this means that the measured values are horizontally shifted onto the corresponding planes in the direction of the route. After this step, bundling of the measured values on the individual planes then results.

Figure 1C:
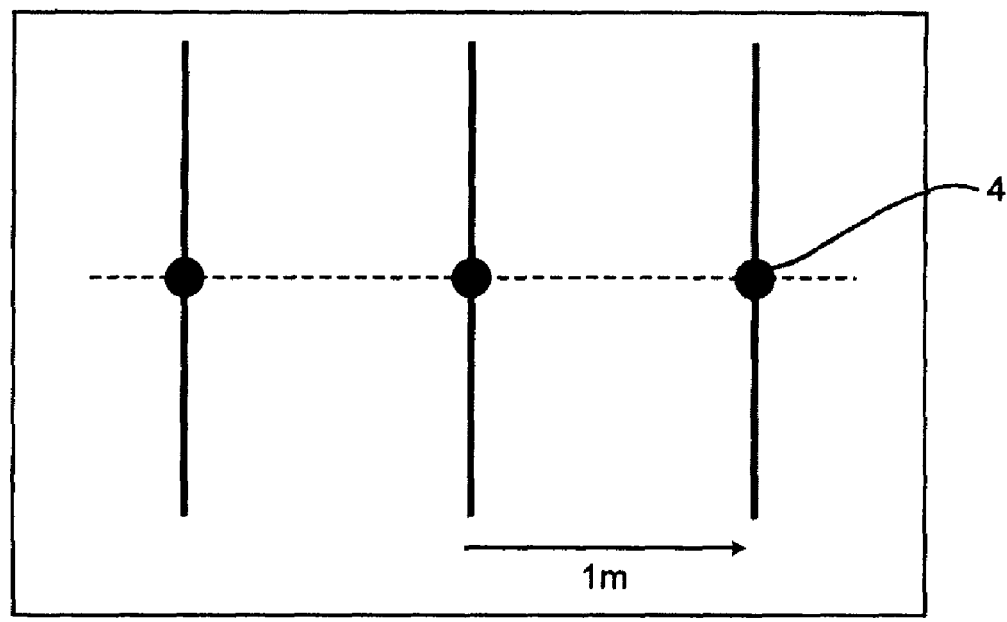

On account of the inaccuracy caused by position-finding, these measured values now differ from the actual position at this location of the route on the plane 2. In order to be able to determine the actual position of the route at this location in an approximately exact manner, the measured values projected onto the plane 2 are averaged using a statistical method. Such a statistical method could be, for example, mean-value formation. This is carried out for each plane 2. As shown in FIG. 1c, the result is then an individual averaged measured value 4 for each plane 2, from which the approximately exact position of the route can then be determined.

This method is based on the idea that the measured values are averaged only using those measured values whose horizontal position information, that is to say the position information in the direction of the route, has been eliminated.

Figure 2:
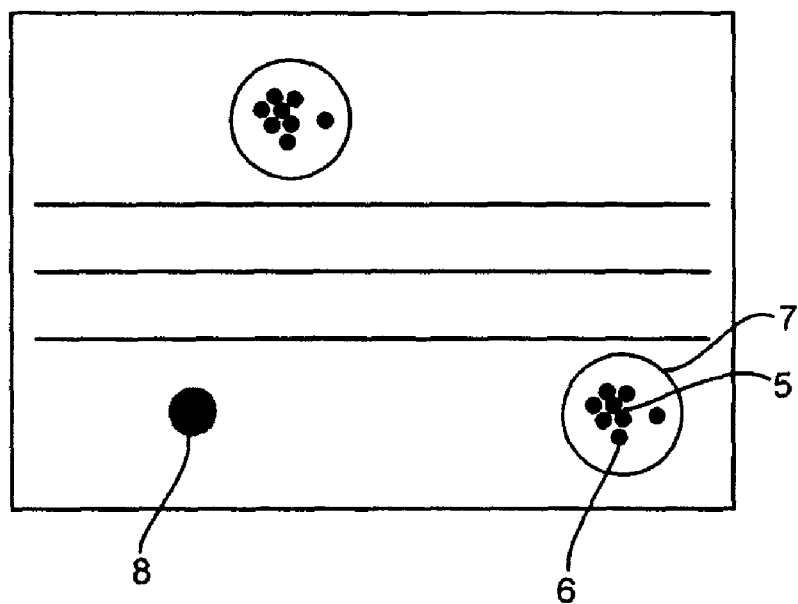
FIG. 2: shows a diagrammatic illustration of measured values when surveying objects.

FIG. 2 diagrammatically illustrates the operation of surveying and exactly determining the position of objects 5, for example landmarks. Like when surveying routes, the objects 5 are first of all surveyed repeatedly, with the result that there are a plurality of measurement points 6 for each object. In a second step, a particular region 7 is then placed around the assumed position of the object 5. All of the measured values 6 in this region 7 are then likewise averaged using a statistical method, thus subsequently resulting in the sufficiently exact position of the relevant object 5.

Previously filtering the different series of measurements and measured values thus makes it possible, for example, to filter out phantom objects 8 which do not exist at all in reality. Even objects which are very far away from the road can be filtered out in advance, so that only landmarks in the vicinity of the road are taken into consideration.

Figure 3:
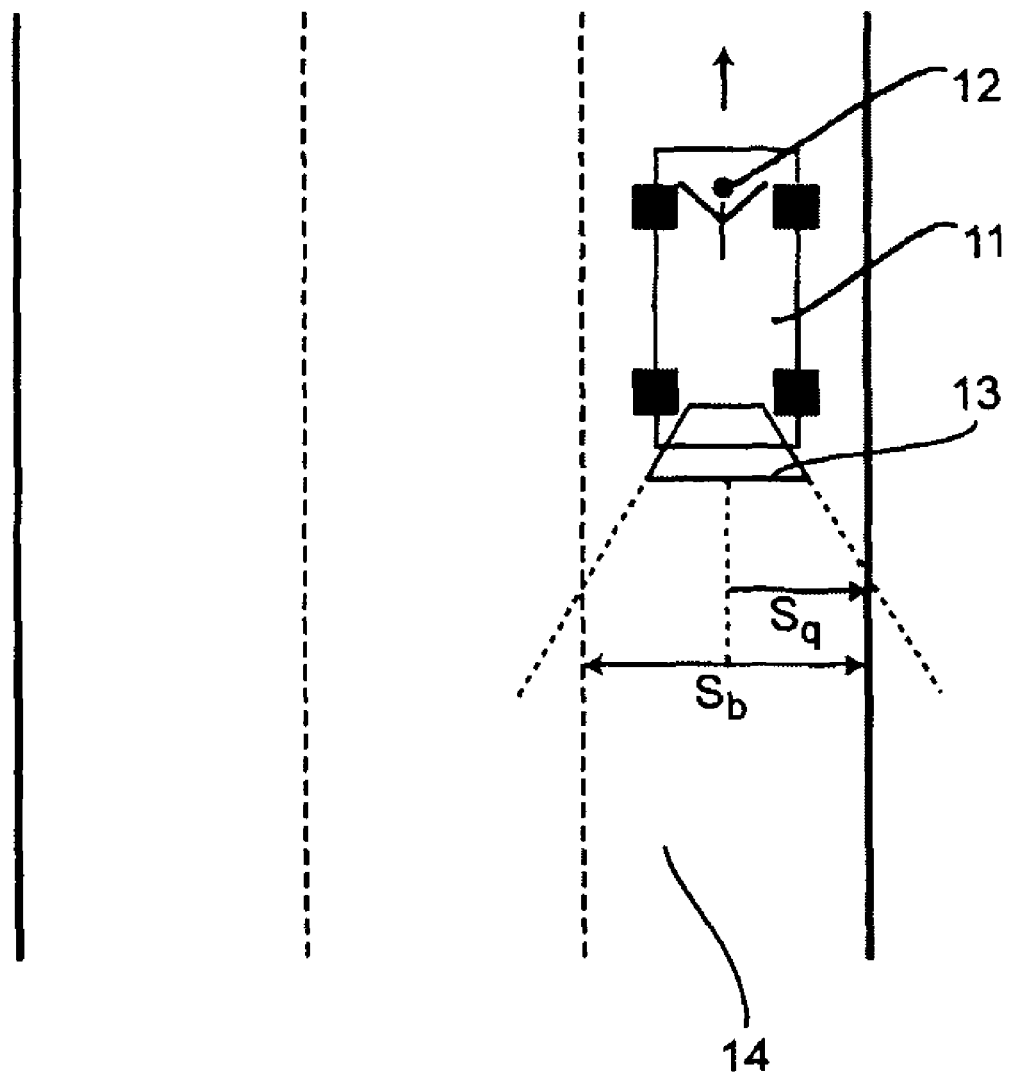
FIG. 3: shows a diagrammatic illustration of an operation of surveying a lane using a lane detection system.

FIG. 3 shows a diagrammatic illustration of an operation of surveying a lane using a special vehicle 11. In this case, the vehicle 11 is equipped with a satellite position-finding system 12, for example a GPS receiver, and a lane detection system 13, in which case the lane 14 is intended to be surveyed. In this exemplary embodiment, the lane detection system 13 is in the form of a camera which records the route or the lane 14. The system is able to determine both the width $S_b$ of the lane and the cross-track distance $S_q$, that is to say the distance between the center of the vehicle and the right-hand highway delimitation, using the recorded image information.

The position values determined by the satellite position-finding system 12 are respectively stored together with the current lane information (lane width and/or cross-track distance). They can then be used to determine the value by which the measured position differs from the right-hand highway delimitation, for example. The positions can then be corrected by this value.

However, it is also conceivable for the lane 14 to be detected with the aid of the lane detection system 13, with the result that only those measured values which were also measured in the corresponding lane are used to determine the position of the lane.

Figure 4A:
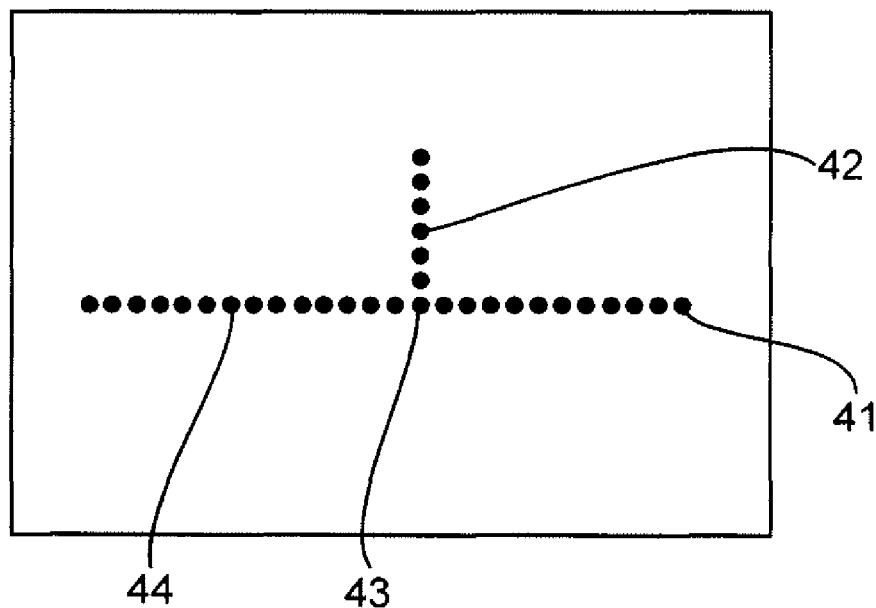
FIGS. 4a, 4b: show a diagrammatic illustration of routes which intersect and are at a tangent.

FIG. 4a shows an illustration of two intersecting routes 41 and 42. The highly accurate position of the two routes 41 and 42 was first of all determined with the aid of the abovementioned method, with the result that the position of each route is determined from a set of node positions. Both routes 41 and 42 meet one another in the region 43 in such a manner that a T-intersection is produced at this location. There are two nodes in the region 43, one node belonging to the route 41 and the other node belonging to the route 42. In this exemplary embodiment in FIG. 4a, both nodes have the same position in the region 43, with the result that the position of the topology can be exactly inferred therefrom.

If it were known at this location, for example, that the route 42 represented a one-way street in the direction of the route 41, it could be deduced from this, for the topology in the region 43, that it is not possible to enter the route 42 from the route 41 whilst complying with the existing traffic regulations. Therefore, turning off the route 41 into the route 42 is not allowed in the region of the topology 43.

Figure 4B:
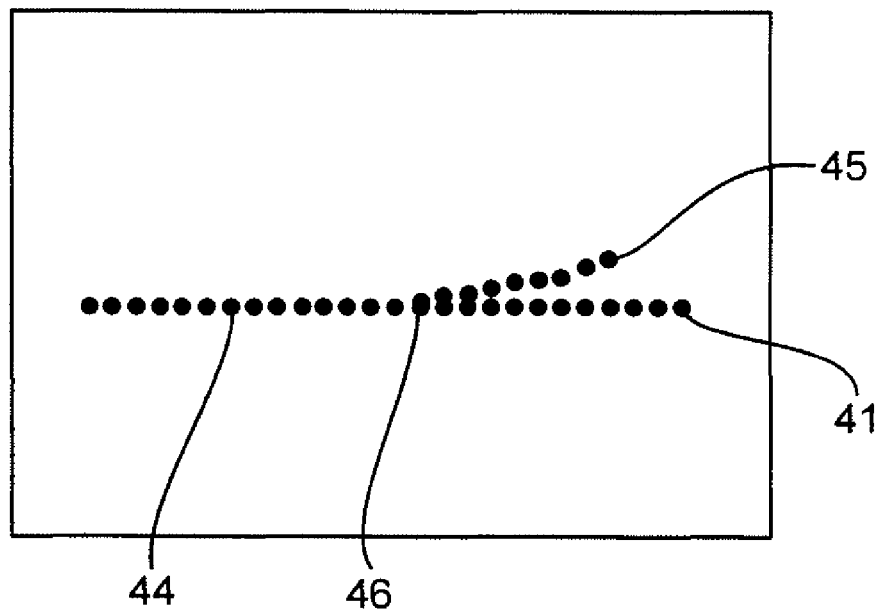

FIG. 4b diagrammatically shows an illustration that is similar to that in FIG. 4a, in which case a route 45 is at a tangent to a route 41. It can be seen in this exemplary embodiment that the two nodes of the respective route 41 and 45 do not have exactly the same position in the region 46. However, a suitably selected surrounding area in the region 46 could be used to discern that the two routes 41 and 45 are at a tangent in this region. The position of the topology can then be determined on the basis of the nodes which are arranged in the tangential region, for example by means of mean-value formation.

If it is known, for example, that the two routes 41 and 45 are rails, a point can be inferred in the region 46 and its position can be determined on the basis of the region 46. However, it is also conceivable, for example, for the route 41 to be a freeway and for the route 45 to be an exit, with the result that the position or the start of the freeway exit can be inferred in the region 46.

The invention claimed is:

1. A computer implemented method for digital mapping of one or more routes, comprising the steps of:
    repeatedly surveying one or more routes to be recorded with one or more vehicles which traverse the routes, and which are equipped with a position finding system, said repeatedly surveying producing recorded measured values for said one or more routes for each survey;
    superimposing, using a computer, the recorded measured values obtained from said repeatedly surveying step, said superimposing step forming a plurality of superimposed measured values;
    projecting, using a computer, at least a portion of the superimposed measured values onto a plurality of planes which are associated with said superimposed measured values, said projecting step shifting at least some of said portion of the superimposed measured values to one of said plurality of planes and producing projected measured values on each of said planes;
    averaging, using a computer, said projected measured values to identify a single node on each of said plurality of planes which is an average of said projected measured values on each of said planes; and
    identifying a mapped route which passes through each single node on each of said plurality of planes.

2. The computer implemented method according to claim 1, further comprising generating a digital map which includes a plurality of mapped routes identified in said identifying step.

3. The computer implemented method according to claim 1, further comprising filtering out greatly differing measured values and/or phantom objects.

4. The computer implemented method according to claim 1 wherein the planes in the superimposed measured values are perpendicular to at least one of said one or more routes.

5. The computer implemented method according to claim 1 wherein at least one item of lane information which correlates with at least one measured value is determined when surveying routes in said repeatedly surveying one or more routes step.

6. The computer implemented method according to claim 5, wherein position of a lane of a multilane route is determined on the basis of the measured values and the lane information.

7. The computer implemented method according to claim 5, wherein the lane information is used to determine a relative position of the measured values which correlate with the lane information inside a lane and/or a route and further comprising step of correcting for the relative position of the recorded measured values.

8. The computer implemented method according to claim 1 further comprising the step of determining a position of a topology on the basis of the positions of at least two routes which intersect or are at a tangent.

9. The computer implemented method according to claim 8, wherein the position of the topology is determined on the basis of a plurality of nodes, each node being assigned to a position of the routes which intersect or are at a tangent.

10. The computer implemented method according to claim 9, wherein at least two nodes of said plurality of nodes have the same position.

11. The computer implemented method according to claim 8, wherein at least one property of the topology is determined on the basis of at least one property of the routes which intersect or are at a tangent.

12. The computer implemented method according to claim 11, wherein an interlinking relationship of the routes which intersect or are at a tangent is determined on the basis of at least one property of the topology and/or on the basis of at least one property of the routes which intersect or are at a tangent.

* * * * *